United States Patent
Yin

(10) Patent No.: US 9,051,466 B2
(45) Date of Patent: Jun. 9, 2015

(54) DEGRADABLE PLASTIC AND MANUFACTURING METHOD THEREOF

(75) Inventor: Zhengfu Yin, Yangzhou (CN)

(73) Assignee: JIANGSU JINHE HI-TECH CO., LTD., Yangzhou (CN)

( * ) Notice: Subject to any disclaimer, the term of this patent is extended or adjusted under 35 U.S.C. 154(b) by 15 days.

(21) Appl. No.: 13/882,883

(22) PCT Filed: Apr. 22, 2011

(86) PCT No.: PCT/CN2011/073174
§ 371 (c)(1), (2), (4) Date: May 1, 2013

(87) PCT Pub. No.: WO2012/116515
PCT Pub. Date: Sep. 7, 2012

(65) Prior Publication Data
US 2013/0225731 A1   Aug. 29, 2013

(30) Foreign Application Priority Data

Feb. 28, 2011   (CN) .......................... 2011 1 0047452

(51) Int. Cl.
| C08K 11/00 | (2006.01) |
| C08L 89/00 | (2006.01) |
| C08L 97/02 | (2006.01) |
| C08L 67/04 | (2006.01) |
| C08L 67/02 | (2006.01) |

(52) U.S. Cl.
CPC ............... *C08L 97/02* (2013.01); *C08L 67/04* (2013.01); *C08L 67/02* (2013.01)

(58) Field of Classification Search
CPC .......... C08L 67/04; C08L 97/02; C08L 67/02
USPC .......................................................... 524/9
See application file for complete search history.

(56) References Cited

U.S. PATENT DOCUMENTS

| 3,965,051 | A * | 6/1976 | Markusch et al. ............. 521/100 |
| 5,614,564 | A * | 3/1997 | Hwang et al. ................. 521/84.1 |
| 5,891,937 | A * | 4/1999 | Berg et al. ........................ 524/13 |
| 6,025,417 | A * | 2/2000 | Willett et al. .................... 524/17 |
| 6,071,984 | A * | 6/2000 | Grigat et al. ................... 523/128 |
| 6,120,895 | A * | 9/2000 | Kowitz et al. ................. 428/364 |
| 6,293,045 | B1 * | 9/2001 | Morgan ............................... 47/9 |
| 6,624,217 | B1 * | 9/2003 | Tong ................................. 524/9 |
| 6,632,863 | B2 * | 10/2003 | Hutchison et al. .............. 524/13 |
| 8,231,954 | B2 * | 7/2012 | Li et al. ....................... 428/36.92 |
| 8,299,172 | B2 * | 10/2012 | Schilling et al. ............. 525/54.1 |
| 2003/0124937 | A1 * | 7/2003 | Williams et al. ............... 442/327 |
| 2003/0216496 | A1 * | 11/2003 | Mohanty et al. ............... 524/284 |
| 2004/0248486 | A1 * | 12/2004 | Hodson ............................ 442/79 |
| 2005/0136259 | A1 * | 6/2005 | Mohanty et al. ............... 428/409 |
| 2007/0043148 | A1 * | 2/2007 | Yi et al. ........................... 524/47 |
| 2007/0087097 | A1 * | 4/2007 | Cheng ........................... 426/482 |
| 2007/0179253 | A1 * | 8/2007 | Matsuoka et al. ............. 525/438 |
| 2007/0259584 | A1 * | 11/2007 | Whitehouse .................. 442/417 |
| 2007/0287795 | A1 * | 12/2007 | Huda et al. .................... 524/703 |
| 2008/0153940 | A1 * | 6/2008 | Scheer et al. ................. 523/124 |
| 2009/0082491 | A1 * | 3/2009 | Nascimento et al. ........... 524/14 |
| 2009/0171037 | A1 * | 7/2009 | Aoshima et al. .............. 525/418 |
| 2009/0260918 | A1 * | 10/2009 | Cao et al. ...................... 181/290 |
| 2009/0274920 | A1 * | 11/2009 | Li et al. ......................... 428/481 |
| 2010/0086714 | A1 * | 4/2010 | Sato ............................. 428/35.7 |
| 2010/0093922 | A1 * | 4/2010 | Johnson, Sr. .................. 524/587 |
| 2010/0120966 | A1 * | 5/2010 | Sigworth et al. .............. 524/450 |
| 2010/0144932 | A1 | 6/2010 | Kwon et al. |
| 2011/0052847 | A1 * | 3/2011 | Roberts et al. ............... 428/35.7 |
| 2011/0135863 | A1 * | 6/2011 | Li et al. ...................... 428/36.92 |
| 2011/0136978 | A1 * | 6/2011 | Li et al. ........................ 525/54.3 |
| 2011/0180225 | A1 * | 7/2011 | Cao et al. ...................... 162/145 |
| 2012/0016328 | A1 * | 1/2012 | Shi et al. ................... 604/385.01 |
| 2012/0035287 | A1 * | 2/2012 | Scheer et al. ................... 521/92 |
| 2012/0090759 | A1 * | 4/2012 | Parssinen et al. ............ 156/62.8 |
| 2012/0193048 | A1 * | 8/2012 | Gogichev ........................ 162/50 |
| 2013/0096238 | A1 * | 4/2013 | Alsewailem et al. ........... 524/15 |
| 2013/0237647 | A1 * | 9/2013 | Yin .................................. 524/9 |

FOREIGN PATENT DOCUMENTS

| CN | 101200581 A | 6/2008 |
| CN | 101792581 A | 8/2010 |
| DE | 102008018964 A1 | 3/2009 |
| JP | 2002363432 A | * 12/2002 |

OTHER PUBLICATIONS

Panthapulakkal et al. (Bioresource Technology 97, 2006, 265-272).*
Nyambo et al. (Biomacromolecules 2010, 11, 1654-1660).*
Kim et al., Journal of Applied Polymer Science, vol. 97, 1513-1521 (2005).*
Machine translation of JP 2002363432 A, 2014.*

* cited by examiner

*Primary Examiner* — Liam J Heincer
(74) *Attorney, Agent, or Firm* — Rabin & Berdo, P.C.

(57) ABSTRACT

A degradable plastic and a manufacturing method thereof are provided. The degradable plastic is made by mixing plastic, dry crop straw scraps and additives and extruding the mixture into granules with a double-screw extruder. The weight fraction of the plastic, crop straw scraps and additives is 63-73 wt %, 23-33 wt % and 4-6 wt % based on the total weight of raw material. The obtained granules are even, stable and can be used to manufacture daily necessities such as dishware, containers, stationery and bags having smooth surface, high strength, excellent toughness and comfortable hand feeling.

2 Claims, No Drawings

DEGRADABLE PLASTIC AND MANUFACTURING METHOD THEREOF

FIELD OF THE INVENTION

The present invention relates to a degradable plastic and a manufacturing method thereof, especially to a degradable plastic made from crop straw and a manufacturing thereof.

BACKGROUND OF THE INVENTION

With the development of the plastics industry, plastics are applied widely in daily use, and the amount consumed is much higher and higher. As the plastics are mostly non-degradable, they consume the world's oil resources lot, and the wasters poison the environment seriously.

Crop straw is one kind of agricultural waste, it is usually burn. Burning not only wastes the potential value of the crop straw but also pollutes the air. The smog produced in the burning blocks the view, which causes security issues. The flame may also cause burns.

SUMMARY OF THE INVENTION

The object of the present invention is to provide with a degradable plastic made from crop straw to reduce environmental pollution caused by abandoning the non-degradable plastic and to collect and use the crop straw.

A degradable plastic comprising degradable plastic, crop straw and plastic additives, the weight fraction of the degradable plastic, crop straw and additives is 63-73 wt %, 23-33 wt % and 4-6 wt % based on the total weight of raw material.

The degradable plastic is poly lactic acid (PLA) or poly butylenes succinate (PBS).

In the degradable plastic, degradable material such as poly-caprolactone (PCL) and polyhydroxyalkanoates (PHA) can be added into the formula as additives to adjust the intensity of the products.

The crop straw is any of rice straw, wheat straw, wheat bran, corn cob or corn stalk.

The plastic additives are any of silane coupling agent, aluminate/titanate complexing coupling agent, ethylene bis-stearomide or titanium dioxide.

The processing temperature of the present invention can be reduced to 140~160° C. for moulding, the heat-resistance temperature of the present invention reaches to 80~100° C., which satisfies the usual usage. The present invention can replace the conventional plastic, such as polypropylene, and it can be used to manufacture daily necessities such as dishware, containers, stationery and bags by blow film, drawing or injection molding. The plastic products made from the materials of the present invention appears the color of natural wood, plant fiber grain on the surface, smooth surface, high strength, excellent toughness and comfortable hand feeling. As the materials of the present invention are degradable, the present invention is degradable. Thereinto, the longest degradatic period is 180 days. So the degradatic period of the present invention is 180 days at most, making the present invention green and environmental-protective.

Another object of the present invention is to provide with a crop plastic manufacturing method.

Mix the crop straw scraps of 1.5~20 mm in length after being dried, the plastic and the plastic additives, extrude the mixture into granules with a double-screw extruder; the weight fraction of the plastic, crop straw scraps and additives is 63-73 wt %, 23-33 wt % and 4-6 wt % based on the total weight of raw material.

The present invention is easily manufactured, and the obtained granules are even and stable for further manufacturing. It needn't to renovate the old equipments. The present invention not only reduces the cost of the degradable plastic, it also improves the mechanical performance of the degradable plastic, opening way to the widely application of the degradable plastic.

DETAILED DESCRIPTION OF THE EMBODIMENTS

The First Embodiment

Injection Class Products the crop straw is applied with rice straw, crush the rice straw to be scraps of 1.5~20 mm in length, apply silane coupling agent and ethylene bis-stearomide as the plastic additives, mix with the injection class poly lactic acid and extrude the mixture into granules with a double-screw extruder; when adding the material, the weight fraction of the rice straw, the silane coupling agent, the ethylene bis-stearomide and the injection class poly lactic acid is 23~33%, 1~1.5%, 3~4.5%, 63-73% based on the total weight of raw material. The plastic granules applied with this manufacturing method can be used to produce injection parts by injection molding.

The mechanical performance of the products can be adjusted by adding polydiethylene glycol sebacate, the weight fraction of which is 10~75% based on the total weight of raw material. More polydiethylene glycol sebacate makes products softer. Detail additive amount depends on different products requirements.

The degradability of the products made of above plastic granules reaches to 95% after 180 days during composting.

The Second Embodiment

Blow Film Class Products the crop straw is applied with wheat straw and corn stalk, crush the wheat straw and corn stalk of 1000~1200 mesh, apply aluminate/titanate complexing coupling agent, ethylene bis-stearomide and titanium dioxide as the plastic additives, mix with the blow film class polydiethylene glycol sebacate and extrude the mixture into granules with a double-screw extruder; when adding the material, the weight fraction of the wheat straw, the corn stalk, the alumniate/titanate complexing coupling agent, ethylene bis-stearomide, titanium dioxide and the blow film class polydiethylene glycol sebacate is 10~43%, 13~20%, 1~2%, 1.2~2%, 1.5~2%, 63~73% based on the total weight of raw material. The plastic granules applied with this manufacturing method can be used to produce film products by blow film molding.

The mechanical performance of the products can be adjusted by adding polyhydroxyalkanoic (PHA) and polylactic acid, the weight fraction of which is 5~25% based on the total weight of raw material. More polyhydroxyalkanoic and polylactic acid will reduce the softness of the products. Detail additive amount depends on different products requirements.

The film products made of above plastic granules not only has conventional plastic film performance but also has well air permeability, making it applicable in venting and waterproof situation, such as preservative film and inner membrane of paper diapers.

The degradability of the products made of above plastic granules reaches to 95% after 180 days during composting.

The Third Embodiment

Drawing Class Products

The crop straw is applied with rice straw, wheat straw, corn cob, wheat bran, crush above crop straw into powder of 1000~4200 in mesh, apply ethylene bis-stearomide and titanium dioxide as the plastic additives, mix with drawing class polylactic acid and extrude the mixture into granules with a double-screw extruder; when adding the material, the weight fraction of the rice straw, the wheat straw, the corn cob, the wheat bran, the ethylene bis-stearomide, the titanium dioxide and the drawing class polylactic acid is 5~8%, 5~8%, 5~7%, 8~10%, 1.5~2%, 2~4%, 63~73% based on the total weight of raw material.

The plastic granules applied with this manufacturing method can be used to produce sheets products by drawing molding.

The mechanical performance of the products can be adjusted by adding polycaprolactone (PCL), the weight fraction of which is 5~15% based on the total weight of raw material. More polycaprolactone makes the products softer. Detail additive amount depends on different products requirements.

The degradability of the products made of above plastic granules reaches to 95% after 180 days during composting.

INDUSTRIAL APPLICABILITY

The present invention is provided with a degradable plastic and a manufacturing method thereof, the obtained granules are even, stable and can be used to manufacture daily necessities such as dishware, containers, stationery and bags having smooth surface, high strength, excellent toughness and comfortable hand feeling.

What is claimed is:

1. A method of manufacturing a degradable plastic composite comprised of, based on total weight of raw materials, from 63-73 wt % of a degradable plastic; from 23-33 wt % of crop straw; and from 4-6 wt % of at least one additive for the degradable plastic, wherein the method comprising the steps of:
   providing, as the crop straw, wheat straw and corn stalk that have been dried;
   crushing from 10 to 13 wt % of the wheat straw and from 13-20% of the corn stalk, based on total weight of raw materials, to provide crushed crop straw having a 1000 to 4200 mesh;
   providing, as the at least one additive, an additive mixture comprised of, based on total weight of raw materials, from 1 to 2% of aluminate/titanate complexing coupling agent, from 1.2 to 2% of the ethylene bis-stearamide, and from 1.5 to 2% of titanium dioxide;
   mixing the crushed crop straw and the additive mixture with from 63 to 73% of blow film class polydiethylene glycol sebacate as the degradable plastic, based on total weight of raw materials, to provide a raw material mixture; and
   extruding the raw material mixture into granules with a double-screw extruder to provide the degradable plastic composite.

2. A method of manufacturing a degradable plastic composite comprised of, based on total weight of raw materials, from 63-73 wt % of a degradable plastic; from 23-33 wt % of crop straw; and from 4-6 wt % of at least one additive for the degradable plastic, the method comprising the steps of:
   providing, as the crop straw, based on total weight of raw materials, from 5 to 8 wt % of rice straw, from 5 to 8 wt % of wheat straw, from 5 to 7 wt % of corn cob, and from 8 to 10 wt % of wheat bran, that have been dried;
   crushing the crop straw into a powder to provide crushed crop straw having a 1000 to 1200 mesh,
   providing, as the at least one additive, an additive mixture comprised of, based on total weight of raw materials, from 1.5 to 2 wt % of ethylene bis-stearomide and from 2 to 4 wt % of titanium dioxide;
   mixing the crushed crop straw and the additive mixture with from 63 to 73 wt % of drawing class polylactic acid as the degradable plastic, based on total weight of raw materials, to provide a raw material mixture; and
   extruding the raw material mixture into granules with a double-screw extruder.

* * * * *